United States Patent Office 3,843,550
Patented Oct. 22, 1974

3,843,550
PHOTOCHROMIC COMPOSITION
Alain Hinnen, Vauhallan, France, assignor to Saint-Gobain Industries, Neuilly-sur-Seine, France
No Drawing. Filed Oct. 23, 1968, Ser. No. 770,118
Claims priority, application France, Oct. 24, 1967, 125,642
Int. Cl. F21v 9/00; G02b 5/24
U.S. Cl. 252—300   2 Claims

ABSTRACT OF THE DISCLOSURE

This invention relates to new photochromes, compounds which undergo a reversible color change under the impact of actinic light. The new compounds are spiro-pyrans of which indolino-2 spiro-2' benzo-pyran is exemplary. These new compounds are remarkable in that they possess an oxygenated heterocycle coupled to the benzene nucleus of the benzo-pyran. Instead of being oxygenated the heterocycle may have nitrogen as its hetero atom. The hetero atom is capable of establishing an intramolecular link of the Van der Waals' type with the hydrogen atom carried by the carbon in position 3'. These new compositions possess the property of retaining their color for some time after excitation by actinic light has ended.

---

This invention relates to new photochromes, compounds which undergo a color change under the impact of actinic light. The new compounds are spiro-pyrans of which indolino-2 spiro-2' benzo-pyran is exemplary. These new compounds are remarkable in that they possess an oxygenated heterocycle coupled to the benzene nucleus of the benzo-pyran. Instead of being oxygenated the heterocycle may have nitrogen as its hetero atom. The hetero atom is capable of establishing an intramolecular link of the Van der Waals' type with the hydrogen atom carried by the carbon in position 3'. These new compositions correspond to the general formula I and they transform themselves reversibly to the compound of formula II under the impact of actinic light.

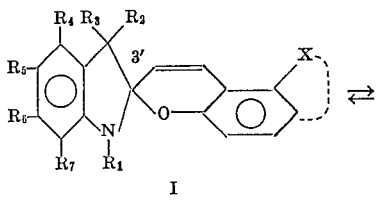

I

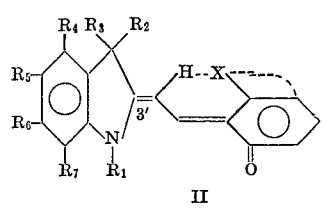

II

The intramolecular linkage is indicated by the dotted lines between H and X in position 3'. X is the hetero atom in the heterocycle which is indicated by the dash line leading from X to the benzene nucleus. In these formulas $R_1$ may be an aliphatic radical of 1 to 4 carbon atoms or substituted or unsubstituted phenyl or benzyl. Substituents $R_2$ and $R_3$ may be aliphatic radicals of 1 to 4 carbon atoms. Substituents $R_4$, $R_5$, $R_6$ and $R_7$ may be hydrogen, halogen (especially fluorine, chlorine or bromine) or methyl, methoxy, or phenyl.

I have established the fact that these new compositions possess the property of retaining their color for some time after excitation by actinic light has ended being, in this respect, far superior to similar compounds which do not have the property of forming this type of intramolecular link between the hydrogen in position 3' and the hetero atom X. As a corollary of this slow decoloration after excitation ceases, these compositions also lose their photochromic properties more slowly, in other words they have a better stability over a period of time.

The new compounds of the invention are made conveniently by the condensation of a Fischer base (Formula III) in which $R_1$–$R_7$ are of the same sense as hereinabove with a salicylaldehyde which has been substituted to introduce the oxygenated or nitrogenated heterocycle characteristic of the invention.

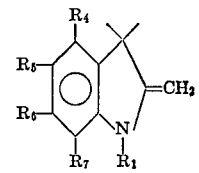

III

The following examples illustrate the invention without limiting the generality elsewhere herein expressed.

EXAMPLE 1

The composition of Formula IV

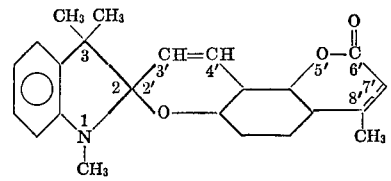

IV named trimethyl-1,3,3-indolino-2 spiro-2' methyl-8' coumarino (7,8b) pyran was prepared by mixing 250 parts by weight of formyl-8 methyl-4 ombelliferone which was first prepared by Parikh (Chem. Abst. 49, 10.276) of which the formula is

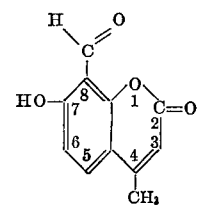

by reaction with 200 parts by weight of the Fischer base of Formula III bis

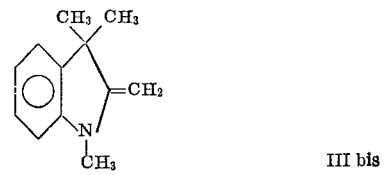

III bis

The Fischer base was in approximately 15 parts by weight of methanol. When the weights of the reactants are measured in milligrams the methanol is measured in cc. The mixture is heated on the water bath in a sealed tube for about an hour, is cooled and is filtered to remove the crystalline precipitate and is recrystallized in cyclohexane, yielding 150 mg. of the compound represented by Formula IV. The product is colorless crystals melting at 176° C. When irradiated by ultraviolet light the composition acquired a blue color. After removal of the exciting light the speed of decoloration and the loss of photochromic properties (in solution in benzene) are about one-fifteenth of that of the corresponding spiropyrans which do not include the heterocycle characteristic of this invention, that is to say, 1,3,3-trimethyl indolino-2 spiro-2' benzo (b) pyran.

EXAMPLE 2

This example concerns the preparation of trimethyl-1, 3,3 indoline-2 spiro-2' dimethyl-6',7'- chromono (7,8, b) pyran having the formula

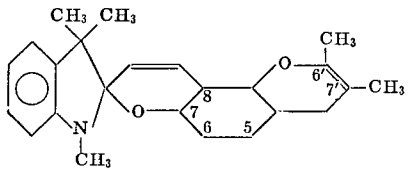

V

A sealed tube is heated for an hour at 140°, containing 1 g. of hydroxy-7 formyl-8 dimethyl2,2 chromone (Ann. Chim. Rome, 50 1642 (1960) having the formula

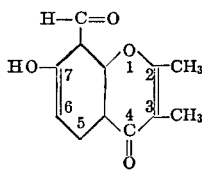

with .85 mg. of the Fischer base of Formula III bis in 50 cc. of methanol. The tube is cooled and the crystals removed by filtration, recrystalized in cyclohexane, yielding 1.1 g. of trimethyl-1,3,3 indoline-2 spiro-2' dimethyl-6,7 chromono (7,8,b) pyran.. These crystals are colorless and melt at 217° C. When dissolved in benzene and irradiated by ultraviolet light the solution is colored red. It remains colored 3 to 4 times longer than a spiro-pyran which does not include the heterocycle characteristic of this invention.

EXAMPLE 3

Trimethyl-1,3,3 indoline-2 spiro-2' quinolino (7,8,b) pyran of Formula VI

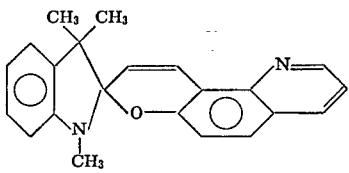

VI is made by heating 400 mg. of hydroxy-7, formyl-8 quinoline (Roczniki Chem., 17, 30, 1937) having the formula

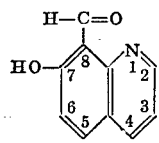

with 400 mg. of the Fischer base of Formula III bis in 10 cc. of methaonl at 100° C. The reaction mass is cooled and filtered and the crystals are recrystalized from hexane. The crystals are colorless and melt at 215° C. In benzene when irradiated by ultraviolet light the solution becomes red and retains color, after removal of the exciting source of light, 10 times longer than a solution of corresponding composition which contains no heterocycle.

The novel compounds have the following uses:

(1) The compound according to the Formula IV described in the example 1 produces an uncolored solution in the non-polar solvents. So, a solution of the said compound in toluene e.g. at a concentration of 4.10$^{-3}$ mol. per liter is not colored in the visible light. However, under the influence of U.V. radiations (λ from 3000 to 4000 A.) the solution turns to a blue coloration which totally disappears only one minute after the irradiation has ended. Such a solution is useful for making an optical filter by placing it into a trough having two parallel walls made of a material transparent to U.V. radiations.

(2) The compound according to the Formula V described in the example 2 may be used as follows: a mixture of 1 gr. of polyvinyl butyral powder, 10 mg. of the said photochromic compound and 300 mg. of dioctyl-phthalate is extruded at a temperature of 120° C. One obtains a sheet of photochromic polyvinyl-butyral. Under excitation by U.V. radiations, this sheet turns to a red coloration which disappears about 10 seconds after the irradiation has ended.

(3) The compound according to the Formula VI of the example 3 may be used as follows: a mixture of 150 gr. of polystyren, 5,5 gr. of tricresyl phosphate and 0,4 gr. of the said photochromic compound is extruded at a temperature of 180° C. One obtains samples of 1,3 mm of thickness, such a sample becomes red under the influence of a U.V. radiation. The coloration disappears about 10 seconds after the excitation has ceased.

As many apparently widely different embodiments of the present invention may be made without departing from the spirit and scope thereof, it is to be understood that the invention is not limited to the specific embodiments.

What is claimed is:

1. A light-sensitive composition including as the essential photochromic sensitive element 1,3,3, trimethyl indolino-2-spiro-2'-methyl-8'-cumarino (7,8,b) pyran.

2. A photochromic material comprising a benzene solution of a compound having the formula

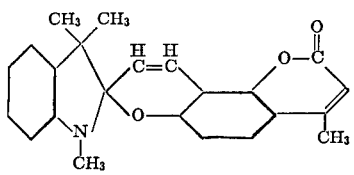

References Cited

UNITED STATES PATENTS

| | | | |
|---|---|---|---|
| 3,534,092 | 10/1970 | Gautron | 258—300 |
| 3,299,079 | 1/1967 | Taylor | 260—165 |

FOREIGN PATENTS

| | | | |
|---|---|---|---|
| 1,092,124 | 11/1967 | Great Britian | 96— 90 R |
| 1,451,332 | 7/1966 | France | 252—300 |

OTHER REFERENCES

Hirshberg et al. "Photochromism and Reversible Internal Transitions in some Spiro-Pirans at Low Temperatures," Journal Chemical Society (London), 1954, pp. 3129–3137.

Day, Chemical Reviews, pp. 65–79, "Thermochromism," 1963.

RONALD H. SMITH, Primary Examiner

J. P. BRANNER, Assistant Examiner

U.S. Cl. X.R.

260—326.11